United States Patent
Hoskins et al.

(10) Patent No.: US 8,164,327 B2
(45) Date of Patent: Apr. 24, 2012

(54) STEERING ANGLE SENSOR

(75) Inventors: Steven R. Hoskins, Walled Lake, MI (US); Michael F. Tefend, Lake Orion, MI (US)

(73) Assignee: Kostal of America, Farmington Hills, MI (US)

( * ) Notice: Subject to any disclaimer, the term of this patent is extended or adjusted under 35 U.S.C. 154(b) by 933 days.

(21) Appl. No.: 12/169,937

(22) Filed: Jul. 9, 2008

(65) Prior Publication Data

US 2009/0051352 A1    Feb. 26, 2009

Related U.S. Application Data

(60) Provisional application No. 60/965,719, filed on Aug. 22, 2007.

(51) Int. Cl.
     *G01B 7/30*      (2006.01)
(52) U.S. Cl. .............................. 324/207.25; 324/207.2
(58) Field of Classification Search ............ 324/207.25, 324/207.2
See application file for complete search history.

(56) References Cited

U.S. PATENT DOCUMENTS

| | | | |
|---|---|---|---|
| 6,082,171 | A | 7/2000 | Wiggenhagen |
| 6,248,993 | B1 | 6/2001 | Bunselmeier |
| 6,380,536 | B1 * | 4/2002 | Inoue et al. ............... 250/231.13 |
| 6,396,386 | B2 * | 5/2002 | Okumura ...................... 338/180 |
| 6,420,697 | B1 | 7/2002 | Donner |
| 6,541,962 | B1 | 4/2003 | Borgmann |
| 6,571,159 | B2 | 5/2003 | Blasing |
| 6,576,889 | B2 | 6/2003 | Borgmann |
| 7,201,069 | B2 | 4/2007 | Sakabe |

* cited by examiner

*Primary Examiner* — Reena Aurora
(74) *Attorney, Agent, or Firm* — Butzel Long

(57) ABSTRACT

A steering angle sensor assembly 10 for determining absolute angular position of a steering wheel of a motor vehicle and includes a multi-axis detector 24 having an active operating mode and a standby operating mode and being adapted to measure speed and direction of rotation of the steering wheel. The steering angle sensor assembly 10 further includes at least one second detector 26 arranged to form a quadrature encoder to detect movement and direction of the steering wheel when the multi-axis detector 24 is in the standby or powered down operating mode.

16 Claims, 4 Drawing Sheets

STEERING ANGLE SENSOR

CROSS-REFERENCE TO RELATED PATENT APPLICATIONS

The present application claims the benefit of and priority to U.S. Provisional Application No. 60/965,719, filed Aug. 22, 2007.

BACKGROUND

1. Field

The disclosure relates to a steering angle sensor for determining the absolute angular position of the steering wheel of a motor vehicle. More particularly, the disclosure relates to an absolute steering angle sensor that functions when the steering angle sensor is in a stand-by or powered-down mode.

2. Description of Related Art

The steering angle or the steering angle deflection in motor vehicles is, for example, required in driving dynamics control systems. Such a driving dynamics control system receives other measuring data in addition to the aforementioned steering angle values, e.g., the rotational speed of the wheels or the turning of the motor vehicle about its vertical axis. In this case, the absolute steering angle deflection as well as the steering speed are required for evaluating these values by the driving dynamics control system together with the other measured data, with the data subsequently being used for controlling actuators, e.g., the brakes and/or the engine management system.

SUMMARY

In one exemplary embodiment, a steering angle sensor for determining absolute angular position of a steering wheel of a motor vehicle is disclosed. The steering angle sensor includes a multi-axis detector having an active operating mode and being adapted to measure speed and direction of rotation of the steering wheel. The sensor further includes at least one second detector arranged to form a quadrature encoder to detect movement and direction of the steering wheel when the multi-axis detector is in a standby operating mode.

In another exemplary embodiment, a steering angle sensor for determining absolute angular position of a steering wheel of a motor vehicle, the steering angle sensor comprising: a first gear connected to a steering wheel shaft; a second gear configured to mesh with the first gear, the second gear including a split gear.

In another exemplary embodiment, a method for determining if a steering wheel of vehicle has moved when the vehicle ignition is off, includes the steps of:
 (a) measuring steering wheel position at a first instant of time when the vehicle ignition is on using a detector arranged to form a quadrature encoder to detect movement and direction of the steering;
 (b) storing the steering wheel position obtained in step (a);
 (c) measuring the position of the steering wheel at a second instant of time when the vehicle ignition is off using the detector arranged to form a quadrature encoder; and
 (d) determining if a difference exists between the position obtained at the first instant of time and the position obtained at the second instant of time indicating a changed position of the steering wheel.

DETAILED DESCRIPTION

Figure 1:
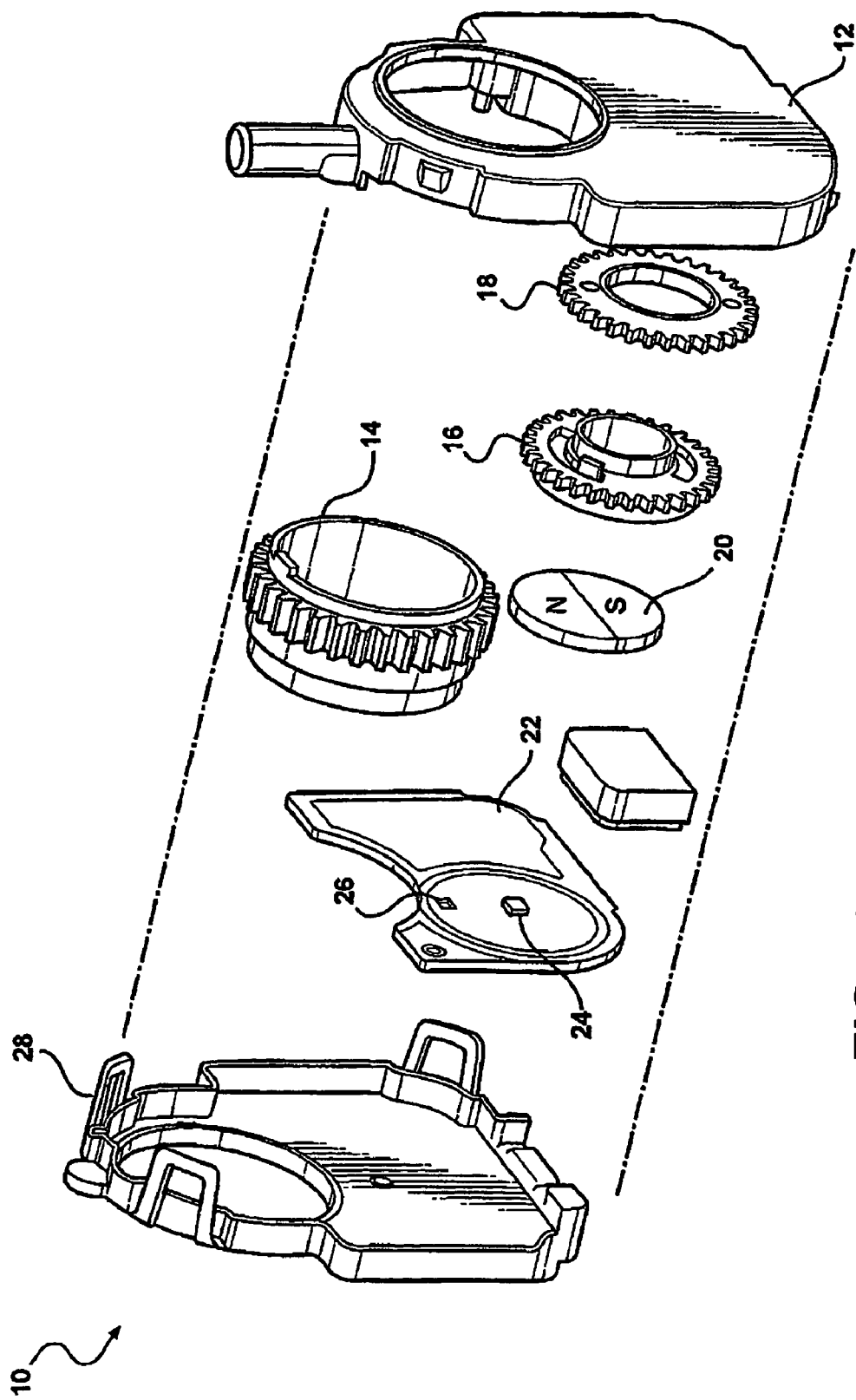
FIG. 1 is an exploded perspective view showing an embodiment of the steering angle sensor of one exemplary embodiment.

Various embodiments of the present disclosure will be described with reference to the accompanying figures. It is to be noted that the same or similar reference numerals are applied to the same or similar parts or elements throughout the Figures, and the description of the same or similar parts and elements will be omitted or simplified.

In the following description, specific details are set forth, such as specific materials, process and equipment, in order to provide a thorough understanding of the present invention. It will be apparent, however, to one skilled in the art that the present invention may be practiced without these specific details. In order instances, well-known manufacturing materials, processes, and equipment are not set forth in detail in order to now obscure the present invention.

Figure 2:
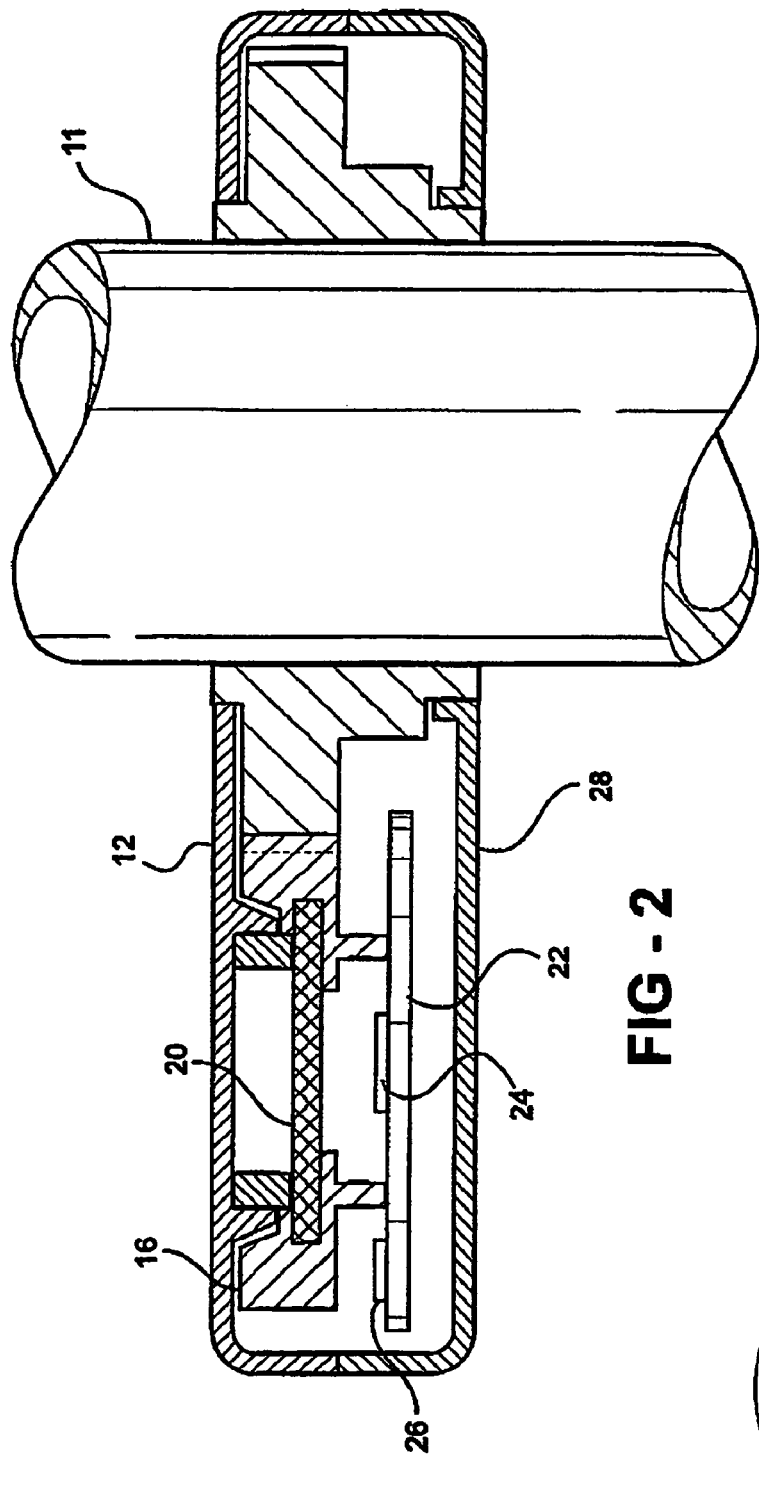
FIG. 2 is a cross-sectional view of the sensor shown in FIG. 1.

Referring to FIGS. 1 and 2, a steering angle sensor 10 is generally shown which measures a steering angle of a steering shaft (rotor) 11 mounted in a vehicle. The steering angle sensor 10 includes a first gear or input gear 14 concentrically mounted to the steering shaft 11 and a second gear assembly comprised of a spur gear 16 and a split gear 18 in mesh with the input gear 14.

Figure 5:
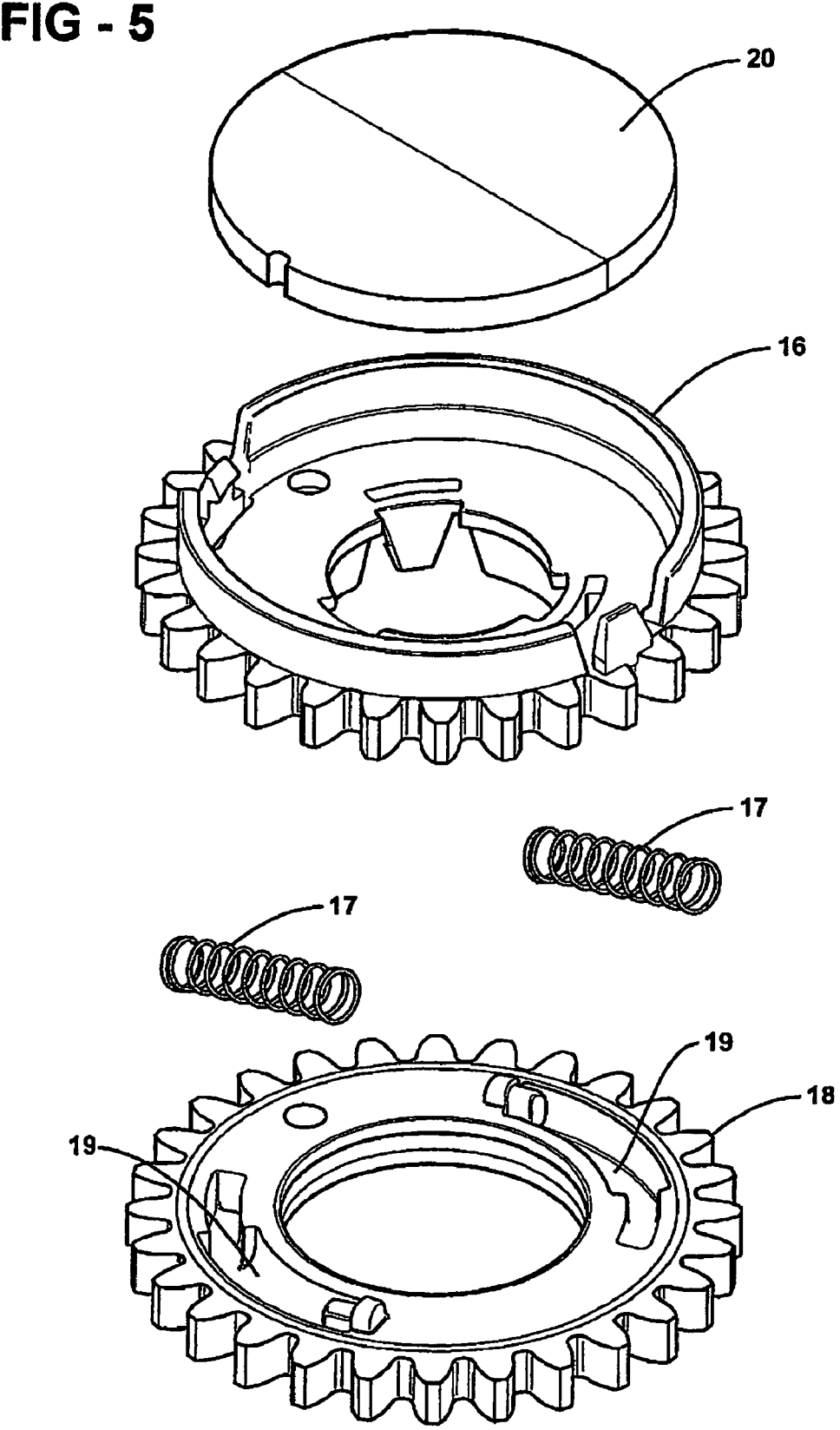
FIG. 5 is an exploded view of a split gear of one exemplary embodiment.

In general, the second gear assembly includes the spur gear 16 and the split gear 18 is smaller in diameter than the input gear 14. That is, the second gear assembly 16, 18 has less gear teeth than the input gear 14. For example, the first gear has a number of gear teeth of "125", and the second gear assembly has a number of gear teeth of "100". Preferably, the gear ratio between the input gear 14 and the spur gear 16 ranges from about 1:1 to 2:1. More preferably, the gear ratio of the input gear 14 to the spur gear 16 is approximately 1.25:1. Referring to FIG. 5, the second gear assembly is comprised of the spur gear 16 and the split gear 18, the split gear 18 is the same size as the spur gear 16 and also has the identical number of teeth as the spur gear 16. The split gear 18 is attached to the spur gear 16 to allow the teeth of the respective gears 16, 18 to be biasingly offset with respect to each other. That is, the split gear 18 is attached to the spur gear 16 through a biasing mechanism, such as a springs 17 disposed in recesses 19, that allow the teeth of the split gear 18 to be biased away from the teeth of the spur gear 16. This ability to be biasingly offset, provides for improved gear mesh between the gear assembly 16, 18 and the input gear 14 as the biasing effect of the biasing mechanism on the split gear 18 provides enhanced engagement of the teeth of the gear assembly 16, 18 with the input gear 14. The split gear 16, 18 also reduce hysteresis and gear lash.

Figure 3:
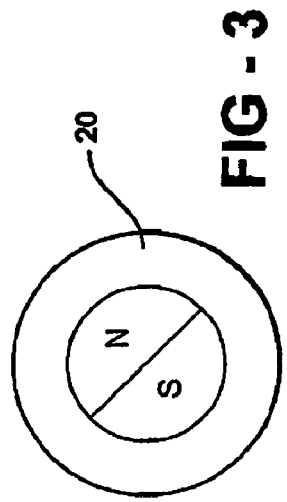
FIG. 3 illustrates an embodiment of a magnet of the steering angle sensor of one exemplary embodiment.

The spur gear 16 includes a multi-pole magnet 20 (north/south poles) which is concentrically mounted to the spur gear 16 as shown in FIGS. 1 and 2. A more detailed illustration of magnet 20 is shown in FIG. 3. The magnet 20 can be made of various materials well known to those in the art including ceramic materials, ferrous powder with ceramic or nylon binders, or the like.

The steering angle sensor 10 includes a first detector unit 24 (Melexis, Concord, N.H.) disposed on a printed circuit board 22 for measuring the speed and direction of steering wheel rotation. The first detector 24 is preferably a multi-axis sensor. The multi-axis detector 24 is preferably a Hall effect sensor stationarily mounted onto the printed circuit board 22 in opposition to the magnet 20 in an axial direction of the second gear assembly 16, 18 to detect an orientation of a magnetic field generated by the magnet 20, which rotates above the detector 24 surface. The first detector 24 measures the absolute 0-360° angle of steering wheel shaft 11 based on the rotation of the input gear 14 and the spur gear 16 and their respective gear ratio.

At least one second detector 26 is stationarily disposed on the printed circuit board 22. The detector(s) 26 is preferably a low-power, Hall-effect-type sensor, operably disposed in proximity to the magnet 20. The detector(s) 26 can operate when the vehicle ignition is on or off. Preferably, the second detector 26 is arranged to create a quadrature encoder to detect when, and in what direction, the steering wheel is moved when the vehicle ignition is in either the on or the off positions. A quadrature encoder is a common type of incremental encoder that uses two output channels to sense position. By utilizing two sensors (24 and 26) that are 90° out of phase, the two output channels of the quadrature encoder 26 indicate both position and direction of rotation. As shown in FIGS. 1 and 2, two Hall detectors 26 are disposed approximately 90° apart from one another on the circuit board. The detectors 26 are also operably disposed opposite to the magnet 20 which rotates above the sensor surface to detect the orientation of a magnetic field generated by the magnet 20. By being oriented to produce the quadrature encoder, the sensors 26 are able to track the number of turns or "turn number" of the steering wheel. By utilizing both the absolute 0-360° angle of steering wheel obtained from the first detector 24 and the turn number obtained from the second detectors 26, the absolute steering angle of the steering wheel can be determined. A cover 28 which mates with the base 12 is utilized to enclose the steering angle sensor assembly 10.

Figure 4:
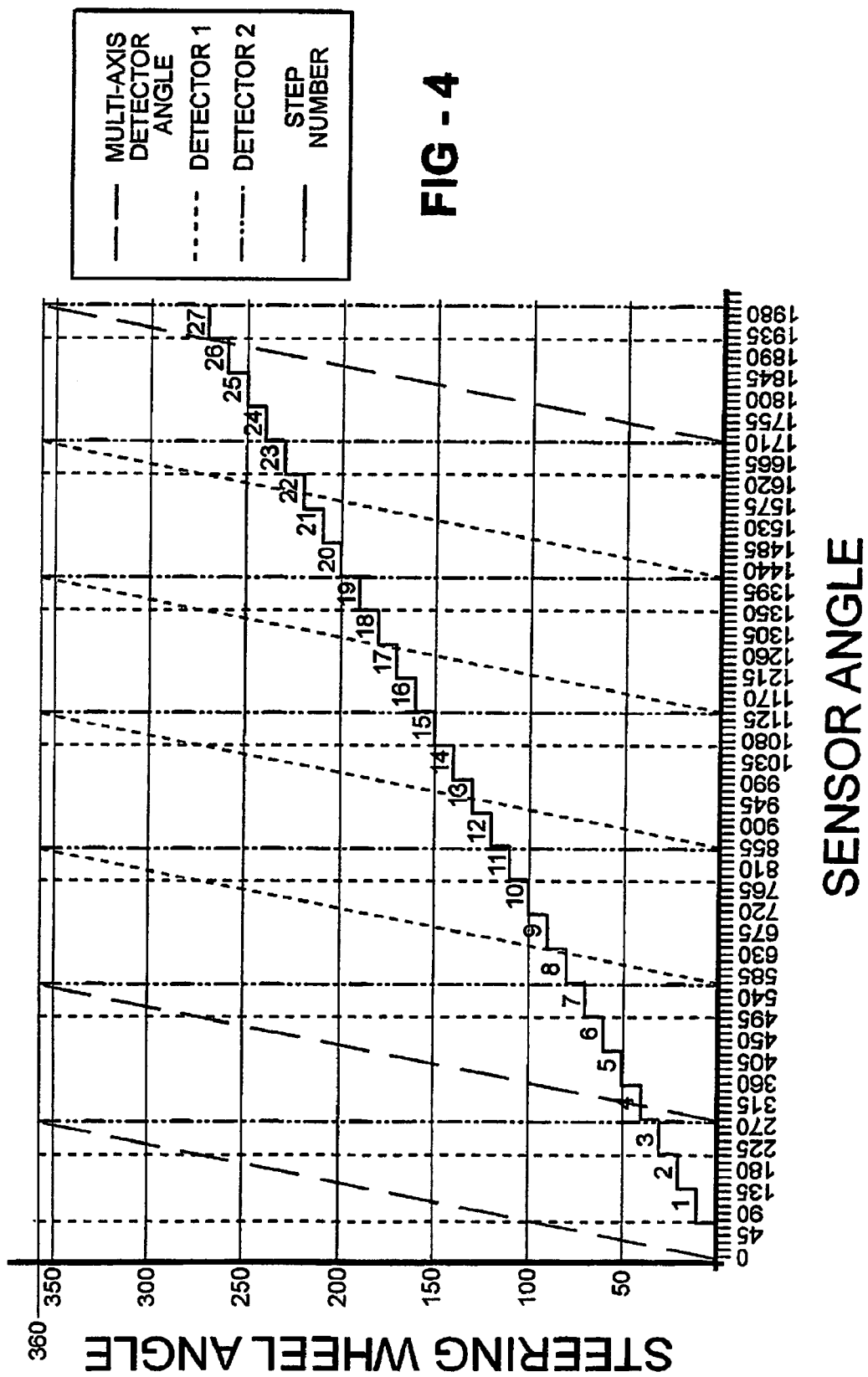
FIG. 4 is a graph schematically illustrating the relationship between the steering wheel angle and the sensor angle.

As shown in the chart in FIG. 4, the first detector 24 produces output angle signals (denoted multi-axis detector angle) which enable detection of a rotation angle of the spur gear 16. Each detector 26 (denoted as Detector 1 and Detector 2) produces a signal processed by the quadrature encoder to give a step number which is indicative of the turn number of the steering wheel.

In operation, when the automobile ignition is in the "on" or powered position, the multi-axis detector 24 tracks the 0-360° position of the steering wheel as the south pole of the magnet 20 passes the detector 24. An internal step counter disposed within an internal microprocessor (not shown) located on the printed circuit board 22 of the steering angle 10 is indexed up (incremented) or down (decremented) depending on the rotational direction of the steering wheel and the value is stored on the onboard memory associated with the steering angle sensor 10. As shown in FIG. 4, a step number is assigned based on the position of the steering wheel. Each step number is unique and only correlates to a given steering wheel angle and turn number of the steering wheel. When the vehicle ignition is turned off, the steering angle sensor 10 enters a powered down or "standby mode". At a predetermined time or frequency, a "wake up" signal is sent to each of the detectors 26 to determine if the steering wheel has been moved during the "standby mode".

If the value of the step number obtained during the "wake-up mode" is the same as compared with the stored value stored when the ignition is on, then there is no change to the state of the detectors 26, indicating that the steering wheel has not been moved in the "standby mode", and the step counter is not adjusted. If the value of the step number obtained by the detectors 26 during the "standby mode" is different than the stored value compared with the value obtained when the ignition was on, this indicates that the steering wheel has moved in the "standby mode", and the step counter is adjusted up or down, accordingly.

The "wake-up" signal can be generated by the internal microprocessor, the second detector 26, or can be generated by an optional external activation mechanism (not shown).

By combining a multi-axis detector 24 with at least one low-power, Hall-effect-type detector 26 and a single magnet 20, the steering angle sensor 10 provides a lower cost alternative to prior art steering angle sensors which utilize at least two of the more expensive, slower acting, and power consuming multi-axis detectors.

As set forth above, while steering angle sensors of the present disclosed embodiments have been described with reference to the devices and structures which are shown, no limitation is intended to such structures and, in the alternative, the structures of various component parts may be replaced with those of arbitrary structures with the same functions.

For instance, with reference to the steering shaft 11 mounted in the vehicle as a rotary member, the embodiments disclosed is not limited to such an application and may be applied to other orientations or applications.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency or the claims are therefore intended to be embraced therein.

What is claimed is:

1. A steering angle sensor for determining absolute angular position of a steering wheel of a motor vehicle, the steering angle sensor comprising:
   a multi-axis detector having an active operating mode and a standby operating mode, said multi-axis detector being adapted to measure speed and direction of rotation of the steering wheel; and
   at least one second detector arranged to form a quadrature encoder to detect movement and direction of the steering wheel when said multi-axis detector is in its standby operating mode, wherein said multi-axis detector and the at least one second detector comprise magnetic sensors.

2. The steering angle sensor of claim 1, further comprising a magnetized portion magnetized in alternate magnetic fields, wherein said magnetic sensors are configured to detect an orientation of magnetic field generated by the magnetized portion.

3. The steering angle sensor of claim 2, further comprising:
   a first gear configured to be concentrically mounted to a rotor connected to the steering wheel; and
   a second gear configured to mesh with said first gear, wherein the magnetized portion is affixed to said second gear and operably disposed opposite the multi-axis detector and the at least one second detector.

4. The steering angle sensor of claim 3, wherein the second gear includes a split-gear.

5. The steering angle sensor of claim 3, wherein said multi-axis detector is configured to detect and store a value corresponding to the rotation angle of the second gear in the active operating mode; and the at least one second detector is configured to periodically detect and store a value corresponding to the rotation angle of the second gear in the standby operating mode.

6. The steering angle sensor of claim 3, wherein the second gear includes a spur gear and a split gear connected to one another via a biasing mechanism.

7. The steering angle sensor of claim 6, wherein the split gear and the spur gear have an identical number of teeth.

8. The steering angle sensor of claim 6, wherein the split gear is the same size as the spur gear.

9. The steering angle sensor of claim 3, wherein the at least one second detector includes two hall detectors that are disposed approximately 90° apart from one another on a circuit board.

10. The steering angle sensor of claim 2, wherein the magnetized portion is concentrically disposed with respect to the second gear.

11. The steering angle sensor of claim 1, wherein the at least one second detector includes two hall detectors.

12. The steering angle sensor of claim 1, wherein the at least one second detector includes two hall detectors that are disposed approximately 90° apart from one another on a circuit board.

13. A steering angle sensor for determining absolute angular position of a steering wheel of a motor vehicle; the steering angle sensor comprising:
a first gear connected to a steering wheel shaft;
a second gear configured to mesh with the first gear, the second gear including a spur gear and a split gear connected to one another via a biasing mechanism, wherein the split gear and the spur gear have an identical number of teeth, and the split gear is the same size as the spur gear.

14. The steering angle sensor of claim 13, wherein the biasing mechanism is a spring.

15. A method for determining if a steering wheel of vehicle has moved when the vehicle ignition is off, the method comprising the steps of:
   (a) measuring steering wheel position at first instant of time when the vehicle ignition is on using a hall detector arranged to form a quadrature encoder to detect movement and direction of the steering;
   (b) storing the steering wheel position obtained in step (a);
   (c) measuring the position of the steering wheel at a second instant of time when the vehicle ignition is off using the hall detector arranged to form a quadrature encoder; and
   (d) determining if a difference exists between the position obtained at the first instant of time and the position obtained at the second instant of time indicating a changed position of the steering wheel.

16. A method according to claim 15, further comprising the step of:
   (e) storing the changed position obtained in step (d).

\* \* \* \* \*